US009616727B2

(12) United States Patent
Ogawa et al.

(10) Patent No.: US 9,616,727 B2
(45) Date of Patent: Apr. 11, 2017

(54) SHOCK ABSORBER MOUNTING DEVICE

(71) Applicant: KYB Corporation, Tokyo (JP)

(72) Inventors: Atsushi Ogawa, Kanagawa (JP); Keiji Saito, Tokyo (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/902,878

(22) PCT Filed: Jul. 24, 2014

(86) PCT No.: PCT/JP2014/069562
§ 371 (c)(1),
(2) Date: Jan. 5, 2016

(87) PCT Pub. No.: WO2015/012351
PCT Pub. Date: Jan. 29, 2015

(65) Prior Publication Data
US 2016/0152108 A1 Jun. 2, 2016

(30) Foreign Application Priority Data

Jul. 24, 2013 (JP) .................................. 2013-153506

(51) Int. Cl.
| | |
|---|---|
| *B60G 15/06* | (2006.01) |
| *B60G 13/00* | (2006.01) |
| *F16F 9/54* | (2006.01) |
| *F16F 15/08* | (2006.01) |
| *B60G 11/22* | (2006.01) |
| *B60G 17/02* | (2006.01) |

(Continued)

(52) U.S. Cl.
CPC ............ *B60G 15/067* (2013.01); *B60G 11/22* (2013.01); *B60G 13/003* (2013.01); *B60G 17/02* (2013.01); *F16F 9/54* (2013.01); *F16F 15/08* (2013.01); *B60G 2204/128* (2013.01); *B60G 2204/41* (2013.01); *B60G 2204/418* (2013.01); *F16F 1/361* (2013.01); *F16F 13/26* (2013.01)

(58) Field of Classification Search
CPC .. B60G 2204/41; B60G 15/067; B60G 11/22; B60G 17/02; F16F 13/26; F16F 1/361
USPC ..... 267/220, 293, 140, 140.14; 280/124.155, 280/124.162, 124.147
See application file for complete search history.

(56) References Cited

U.S. PATENT DOCUMENTS 5,814,999 A * 9/1998 Elie ........................ B60G 7/006
324/662
5,816,587 A 10/1998 Stewart et al.
(Continued)

FOREIGN PATENT DOCUMENTS

| CN | 1664402 A | 9/2005 |
|---|---|---|
| CN | 1803484 A | 7/2006 |

(Continued)

*Primary Examiner* — Thomas Irvin
(74) *Attorney, Agent, or Firm* — Rabin & Berdo, P.C.

(57) ABSTRACT

A shock absorber mounting device joins a shock absorber provided between an axle and a vehicle body to the vehicle body. The shock absorber mounting device includes a magnetic rubber mount having magnetic particles thereinside and being provided between the shock absorber and the vehicle body, an electromagnetic coil configured to apply a magnetic field to the magnetic particles, and a controller configured to supply an excitation current to the electromagnetic coil.

4 Claims, 2 Drawing Sheets

(51) Int. Cl.
*F16F 1/36* (2006.01)
*F16F 13/26* (2006.01)

(56) References Cited

U.S. PATENT DOCUMENTS

| | | | | |
|---|---|---|---|---|
| 5,974,856 A * | 11/1999 | Elie | ............ | B60G 7/02 |
| | | | | 267/140.14 |
| 6,053,291 A * | 4/2000 | Shibahata | ............ | F16F 15/03 |
| | | | | 188/266.1 |
| 6,691,841 B2 * | 2/2004 | Otake | ............ | B60G 17/002 |
| | | | | 188/274 |
| 6,896,109 B2 * | 5/2005 | Kelso | ............ | F16F 9/535 |
| | | | | 188/267.1 |
| 7,284,644 B2 * | 10/2007 | Cmich | ............ | B60G 11/28 |
| | | | | 188/321.11 |
| 8,205,445 B2 * | 6/2012 | Browne | ............ | E04B 1/00 |
| | | | | 248/636 |
| 8,210,547 B2 * | 7/2012 | Rodenbeck | ............ | B60G 11/16 |
| | | | | 280/5.516 |
| 2005/0051936 A1 * | 3/2005 | Gries | ............ | F16F 13/26 |
| | | | | 267/140.14 |
| 2005/0218571 A1 * | 10/2005 | Freudenberg | ............ | F16F 13/26 |
| | | | | 267/140.13 |
| 2005/0263359 A1 * | 12/2005 | Mankame | ............ | E05B 47/0009 |
| | | | | 188/266.1 |
| 2006/0151928 A1 | 7/2006 | Tamura | | |
| 2013/0087985 A1 * | 4/2013 | Marur | ............ | B60G 11/22 |
| | | | | 280/124.177 |
| 2014/0182986 A1 | 7/2014 | Nakajima | | |
| 2015/0054209 A1 * | 2/2015 | Eckel | ............ | F16F 13/08 |
| | | | | 267/140.14 |

FOREIGN PATENT DOCUMENTS

| | | |
|---|---|---|
| JP | 59-167004 U | 11/1984 |
| JP | H05-296283 A | 11/1993 |
| JP | 07-266821 A | 10/1995 |
| WO | WO 2012-026332 A1 | 3/2012 |
| WO | WO 2013-031170 A1 | 3/2013 |

* cited by examiner

SHOCK ABSORBER MOUNTING DEVICE

TECHNICAL FIELD

The present invention relates to a shock absorber mounting device that joins a shock absorber to a vehicle body.

BACKGROUND ART

JP 7-266821A discloses a shock absorber mounting device that includes a spring sheet fixed to a shock absorber rod of a shock absorber, an outer tube fixed to a vehicle body, and a rubber shock absorbing member interposed between the spring sheet and the outer tube.

According to the foregoing shock absorber mounting device, the shock absorbing member elastically deforms in accordance with a load applied from the shock absorber rod, and shock and vibration applied to the shock absorber rod are suppressed from being transmitted to the vehicle body.

SUMMARY OF INVENTION

The damping properties of the foregoing shock absorber mounting device are determined by the stiffness of the shock absorbing member. This gives rise to the following problem: for example, in a case where the condition of a road surface on which a vehicle is running changes, it is difficult to sufficiently suppress shock and vibration transmitted from the shock absorber rod to the vehicle body.

It is an object of the present invention to provide a shock absorber mounting device with variable damping properties.

The shock absorber mounting device according to an aspect of the present invention is a shock absorber mounting device that joins a shock absorber provided between an axle and a vehicle body to the vehicle body. The shock absorber mounting device includes a magnetic rubber mount having magnetic particles thereinside and being provided between the shock absorber and the vehicle body, an electromagnetic coil configured to apply a magnetic field to the magnetic particles, and a controller configured to supply an excitation current to the electromagnetic coil.

DESCRIPTION OF EMBODIMENTS

The following describes an embodiment of the present invention with reference to the attached drawings.

Figure 1:
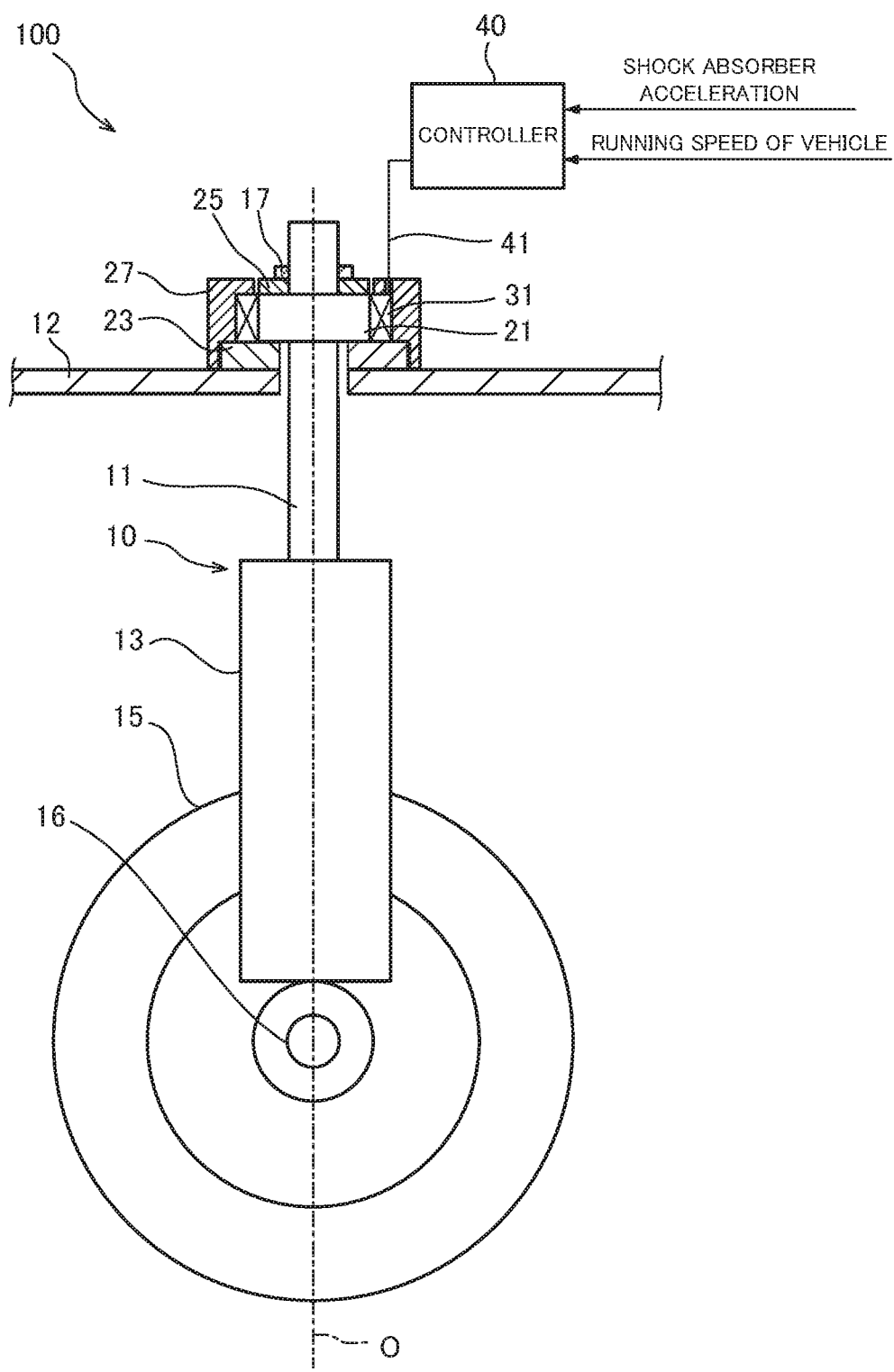
FIG. 1 shows configurations of a shock absorber and a shock absorber mounting device according to an embodiment of the present invention.

As shown in FIG. 1, a shock absorber 10 includes a cylinder 13 and a piston rod 11. The cylinder 13 is joined to an axle 16 of a wheel 15. The piston rod 11 projects from the cylinder 13 and is joined to a vehicle body 12. An extendable and retractable cylindrical shock absorber is used as the shock absorber 10.

Together with the shock absorber 10, a suspension spring (not shown) is provided between the axle 16 and the vehicle body 12. Through extension and contraction, the suspension spring absorbs shock that the wheel 15 receives from a road surface while a vehicle is running. The shock absorber 10 extends and retracts in collaboration with the suspension spring, and damps vibration of the suspension spring using resistance exerted by the oil flow generated thereinside.

Instead of being limited to the above-described configuration, the shock absorber may extend and retract using a linear motor and the like. In this case, the suspension spring is not necessary.

The vehicle is provided with a shock absorber mounting device 100 that joins the piston rod 11 of the shock absorber 10 to the vehicle body 12.

Figure 2:
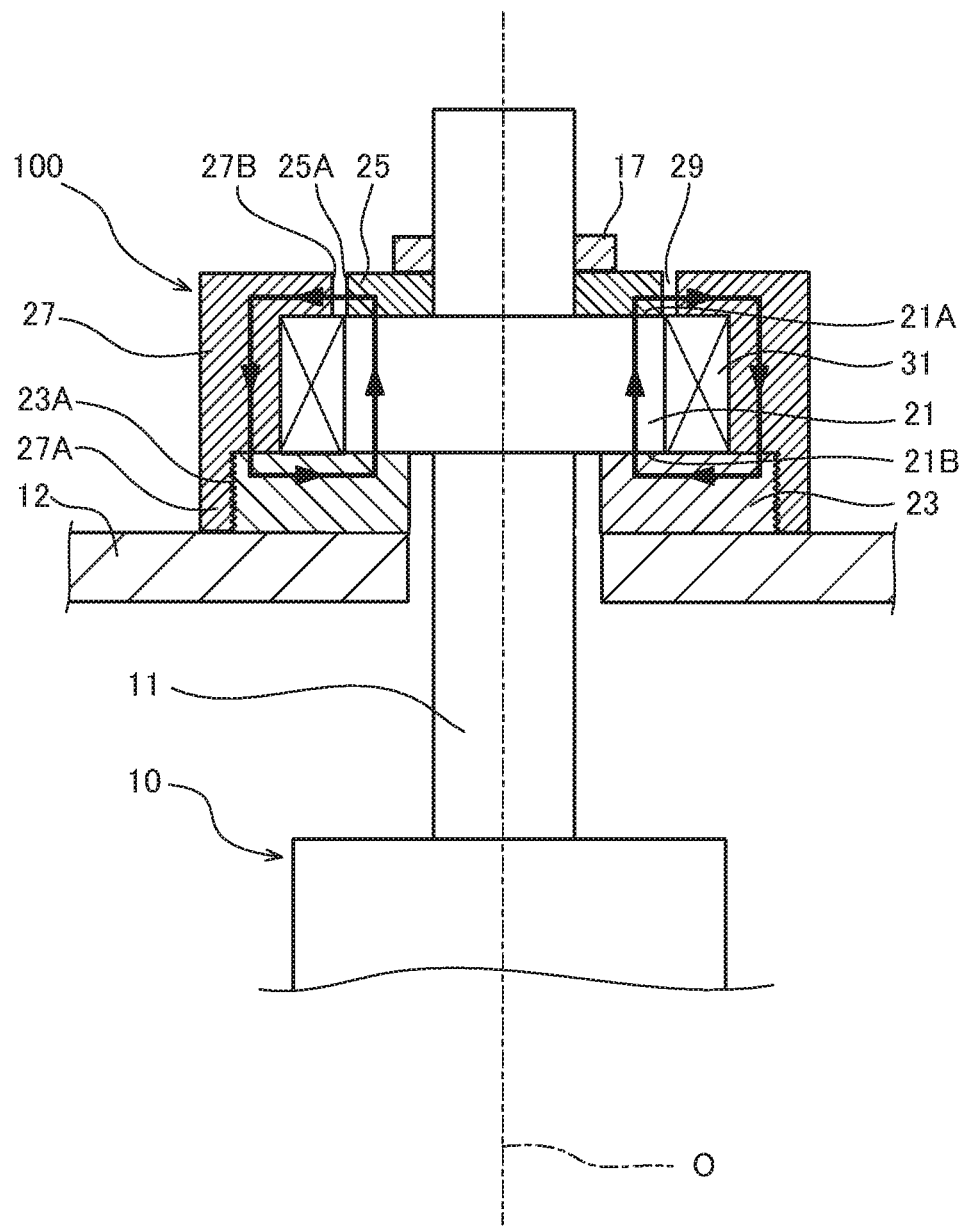
FIG. 2 is a cross-sectional view of the shock absorber mounting device according to the embodiment of the present invention.

As shown in FIGS. 1 and 2, the shock absorber mounting device 100 includes a magnetic rubber mount (shock absorbing member) 21 that damps vibration transmitted from the shock absorber 10 to the vehicle body 12, a vehicle body side joining member 23 that joins the magnetic rubber mount 21 to the vehicle body 12, and a shock absorber side joining member 25 that joins the magnetic rubber mount 21 to the shock absorber 10.

The magnetic rubber mount 21 has an elastic body made of a rubber material, a resin material and the like, and magnetic particles are embedded in the elastic body, that is to say, the magnetic rubber mount 21 has magnetic particles thereinside. For example, particles of a magnetic substance, such as iron powders, are used as the magnetic particles. When a magnetic field is applied to the magnetic rubber mount 21, the magnetic particles are magnetically polarized and aligned along both directions of magnetic field lines, and magnetic coupling between the polarized particles is enhanced. Consequently, the stiffness of the magnetic rubber mount 21 increases.

In this way, the stiffness of the magnetic rubber mount 21 changes as the orientations of the magnetic particles change in response to a change in the magnetic field. A rubber material with magnetic particles dispersed therein is used as the magnetic rubber mount 21. Examples of the rubber material include natural rubber, synthetic rubber, and polyurethane. Rare-earth magnetic powders, iron powders, ferrite, and the like are used as the magnetic particles. The rare-earth magnetic powders are made by adding iron, nitrogen, and the like to neodymium and samarium.

The magnetic rubber mount 21 is formed in a shape of a cylinder, and the piston rod 11 is inserted thereinto. The vehicle body side joining member 23 is coupled to one end surface 21B of the magnetic rubber mount 21. The shock absorber side joining member 25 is coupled to the other end surface 21A of the magnetic rubber mount 21.

The vehicle body side joining member 23 is formed of a magnetic substance made of metal, and is formed in a discoidal shape. The vehicle body side joining member 23 is fastened to the vehicle body 12 via, for example, a bolt (omitted from the drawings).

The shock absorber side joining member 25 is formed of a magnetic substance made of metal, and is formed in a discoidal shape. The shock absorber side joining member 25 is fastened to the piston rod 11 by a nut 17.

In this way, the vehicle body side joining member 23 and the shock absorber side joining member 25 are fastened to each other via the magnetic rubber mount 21. It should be noted that, instead of being limited to the above-described configuration, the magnetic rubber mount 21, the vehicle body side joining member 23, and the shock absorber side joining member 25 may be coupled to one another by adhesion using an adhesive agent.

The shock absorber mounting device 100 includes an electromagnetic coil 31 that surrounds an outer periphery of the magnetic rubber mount 21 as means for applying a magnetic field to the magnetic rubber mount 21.

The electromagnetic coil 31 is composed of a wire member (omitted from the drawings) that is wound many times along the outer periphery of the magnetic rubber mount 21. The wire member is, for example, a copper wire. It should be noted that, instead of being limited to the above-described configuration, the wire member of the electromagnetic coil 31 may be wound on a tube-shaped bobbin with a flange portion, and the magnetic rubber mount 21 may be arranged inside the bobbin.

The shock absorber mounting device 100 includes a controller 40 as means for supplying an excitation current to the electromagnetic coil 31. A lead wire 41 is connected to both ends of the wire member of the electromagnetic coil 31. This lead wire 41 is connected to the controller 40 as well.

The shock absorber mounting device 100 includes a yoke member 27 that surrounds an outer periphery of the electromagnetic coil 31. The yoke member 27 is formed of a magnetic substance made of metal, and is formed in a shape of a cylinder with a flange.

The yoke member 27 includes end portions 27A and 27B. The end portion 27A is coupled to an outer peripheral portion 23A of the vehicle body side joining member 23. The end portion 27B faces an outer peripheral portion 25A of the shock absorber side joining member 25 via a gap 29.

Screw portions that are engaged to each other are formed in the outer peripheral portion 23A of the vehicle body side joining member 23 and in the end portion 27A of the yoke member 27. With the screw portions, the yoke member 27 is fastened and coupled to the vehicle body side joining member 23. It should be noted that, instead of being limited to the above-described configuration, the yoke member 27 may be coupled to the vehicle body side joining member 23 by adhesion or fitting.

Further, the gap 29 may not be provided between the end portion 27B of the yoke member 27 and the outer peripheral portion 25A of the shock absorber side joining member 25 so as to suppress the magnetic field produced by the electromagnetic coil 31 from leaking to the outside of the yoke member 27. In addition, the yoke member 27 may be formed integrally with the vehicle body side joining member 23. Moreover, it is preferable that vibration transmitted from the shock absorber 10 to the vehicle body be transmitted to the entirety of the magnetic rubber mount 21 by setting the outer diameters of the shock absorber side joining member 25 and the vehicle body side joining member 23 to be equal to or larger than the outer diameter of the magnetic rubber mount 21.

The vehicle body side joining member 23, the shock absorber side joining member 25, and the yoke member 27 make up a magnetic path for directing the magnetic field lines induced by the electromagnetic induction effect of the electromagnetic coil 31 to the magnetic rubber mount 21. It should be noted that the piston rod 11 is formed of a non-magnetic substance, and the magnetic flux is concentrated in the magnetic rubber mount 21 rather than the piston rod 11. A part of the piston rod 11 or a part of the shock absorber side joining member 25 may be formed of a non-magnetic substance so as to prevent a short circuit of the magnetic path.

As indicated by arrows representing the magnetic field lines in FIG. 2, the magnetic field produced by the electromagnetic coil 31 is directed in the form of a loop by way of the vehicle body side joining member 23, the magnetic rubber mount 21, the shock absorber side joining member 25, and the yoke member 27.

The vehicle body side joining member 23, the magnetic rubber mount 21, the shock absorber side joining member 25, the yoke member 27, and the electromagnetic coil 31 are arranged coaxially with the shock absorber 10, sharing a central axis O of the shock absorber 10.

The vehicle body side joining member 23 and the shock absorber side joining member 25 are provided in such a manner that the magnetic rubber mount 21 is interposed therebetween along the direction of the central axis O. Consequently, as indicated by the arrows in FIG. 2, the magnetic field lines around the electromagnetic coil 31 are directed to the magnetic rubber mount 21 along the direction of the central axis O of the shock absorber 10. That is to say, the magnetic field lines are directed along the direction in which the magnetic rubber mount 21 extends and contracts when a force induced by vibration and the like acts between the shock absorber 10 and the vehicle body 12.

As the magnetic field lines from the electromagnetic coil 31 are directed to the magnetic rubber mount 21 along the direction of the central axis O of the shock absorber 10, the magnetic particles embedded in the magnetic rubber mount 21 are oriented along the direction of the central axis O. Consequently, the stiffness of the magnetic rubber mount 21 is increased along the direction of the central axis O. That is to say, by directing the magnetic field lines along the direction of extension and contraction of the magnetic rubber mount 21, the damping properties of the shock absorber mounting device 100 can be rendered variable in an efficient manner.

A shock absorber acceleration sensor (omitted from the drawings) that detects a shock absorber acceleration is attached to the cylinder 13 of the shock absorber 10. The shock absorber acceleration sensor moves up and down together with the cylinder 13, and transmits a signal corresponding to the shock absorber acceleration to the controller 40.

The controller 40 receives a detection signal of the shock absorber acceleration of the shock absorber 10 and a detection signal of a running speed of the vehicle, and controls the excitation current directed to the electromagnetic coil 31 in accordance with these detection signals.

It should be noted that, instead of being limited to the above-described configuration, the shock absorber acceleration sensor may be attached to, for example, a suspension arm (omitted from the drawings) that operates in collaboration with the axle 16. Further, a displacement sensor that detects displacements of the piston rod 11 may be provided, and a signal obtained by performing second-order differentiation for the output of the displacement sensor may be used as a shock absorber acceleration. In addition, the shock absorber acceleration sensor may detect relative accelerations of the cylinder 13 and the piston rod 11 as an up-down acceleration of the shock absorber 10.

In a state where the road surface on which the vehicle is running has small concavities and convexities, vibration transmitted to the vehicle body is small, and the detection signal of the shock absorber acceleration is low. In a state where the road surface on which the vehicle is running has large concavities and convexities, vibration transmitted to the vehicle body is large, and the detection signal of the shock absorber acceleration is high.

The controller 40 receives the detection signal of the shock absorber acceleration, and performs control to reduce the excitation current directed to the electromagnetic coil 31 in response to an increase in the shock absorber acceleration. The controller 40 increases the excitation current directed to the electromagnetic coil 31 in response to a decrease in the shock absorber acceleration.

Due to the foregoing control, in a state where the road surface on which the vehicle is running has small concavities and convexities, the stiffness of the magnetic rubber mount 21 is maintained high. As the concavities and convexities of the road surface become large, the stiffness of the magnetic rubber mount 21 becomes low.

This enables the shock absorber mounting device 100 to have damping properties appropriate for the condition of the road surface. Accordingly, shock and vibration transmitted from the shock absorber 10 to the vehicle body 12 are suppressed effectively. Therefore, the ride quality of the vehicle can be improved.

The controller 40 receives the detection signal of the running speed of the vehicle, and performs control to increase the excitation current directed to the electromagnetic coil 31 in response to an increase in the running speed. The controller 40 reduces the excitation current directed to the electromagnetic coil 31 in response to a decrease in the running speed.

A vehicle speed sensor that detects the running speed may be provided to the controller 40. An output signal from a vehicle speed sensor that has been provided in advance to the vehicle may be used.

Due to the foregoing control, in a state where the running speed of the vehicle is low, the stiffness of the magnetic rubber mount 21 is maintained low. As the running speed of the vehicle becomes high, the stiffness of the magnetic rubber mount 21 is increased.

This enables the shock absorber mounting device 100 to have damping properties appropriate for the running speed of the vehicle. Accordingly, the ground-contact properties of the wheel 15 are enhanced, and maneuverability and stability are ensured.

The above-described embodiment achieves the following operational effects.

The shock absorber mounting device 100 includes the magnetic rubber mount 21 having the magnetic particles thereinside and being provided between the shock absorber 10 and the vehicle body 12, the electromagnetic coil 31 configured to apply a magnetic field to the magnetic particles, and the controller 40 configured to supply an excitation current to the electromagnetic coil 31 in accordance with a driving condition of the vehicle.

In this shock absorber mounting device 100, the stiffness of the magnetic rubber mount 21 changes as the orientations of the magnetic particles in the magnetic rubber mount 21 change in response to a change in the magnetic field applied by the electromagnetic coil 31 to the magnetic particles. As the controller 40 supplies the excitation current to the electromagnetic coil 31 in accordance with a driving condition of the vehicle, the electromagnetic coil 31 produces the magnetic field, which is applied to the magnetic particles. This enables the damping properties of the damper mounting device 100 to change.

The shock absorber mounting device 100 further includes the vehicle body side joining member 23 that joins the magnetic rubber mount 21 to the vehicle body 12, the shock absorber side joining member 25 that joins the magnetic rubber mount 21 to the shock absorber 10, and the yoke member 27 that directs the magnetic field produced by the electromagnetic coil 31 between the vehicle body side joining member 23 and the shock absorber side joining member 25. The magnetic rubber mount 21 is arranged on the inner side of the electromagnetic coil 31. The vehicle body side joining member 23, the shock absorber side joining member 25, and the yoke member 27 cover the electromagnetic coil 31.

In this way, the magnetic field lines around the electromagnetic coil 31 are directed to the magnetic rubber mount 21 by way of the vehicle body side joining member 23, the shock absorber side joining member 25, and the yoke member 27. Therefore, the magnetic field of the electromagnetic coil 31 can be applied effectively to the magnetic particles of the magnetic rubber mount 21.

The shock absorber 10 is an extendable and retractable cylindrical shock absorber. The magnetic field produced by the electromagnetic coil 31 acts on the magnetic rubber mount 21 along the direction of extension and retraction of the shock absorber 10.

Consequently, the magnetic field lines from the electromagnetic coil 31 are directed to the magnetic rubber mount 21 along the direction of the axis of the shock absorber 10, and hence the stiffness of the magnetic rubber mount 21 changes along the direction of the axis of the shock absorber 10 in accordance with the strength of the magnetic field. Therefore, the damping properties of the shock absorber mounting device 100 can be changed effectively.

The controller 40 performs control to reduce the excitation current supplied to the electromagnetic coil 31 as the up-down acceleration of the shock absorber 10 increases.

Due to the controller 40 thus controlling the excitation current flowing in the electromagnetic coil 31 in accordance with the shock absorber acceleration, the stiffness of the magnetic rubber mount 21 changes in accordance with the condition of the road surface on which the vehicle is running. This enables the shock absorber mounting device 100 to have damping properties appropriate for the condition of the road surface.

The controller 40 performs control to increase the excitation current supplied to the electromagnetic coil 31 as the running speed of the vehicle body increases.

Due to the controller 40 thus controlling the excitation current flowing in the electromagnetic coil 31 in accordance with the speed of the vehicle body, the shock absorber mounting device 100 can have damping properties appropriate for the speed of the vehicle body.

The embodiment of the present invention is described as above, but the above-described embodiment illustrates only a part of an application example of the present invention and is not intended to limit the technical scope of the present invention to the specific configuration of the above-described embodiment.

For example, the damping properties of the shock absorber mounting device may be changed in accordance with the preference of a driver. As one example, this can be realized by providing the controller 40 with a switch for switching between or among currents to be supplied to the electromagnetic coil 31 and by the driver operating the switch.

Further, while the shock absorber side joining member 25 and the vehicle body side joining member 23 are coupled to both end surfaces 21A, 21B of the magnetic rubber mount 21 in the above-described embodiment, no limitation is intended in this regard. For example, the shock absorber side joining member 25 and the vehicle body side joining member 23 may be coupled to the inner and outer peripheries of the magnetic rubber mount 21.

Furthermore, the shock absorber mounting device of the present invention is not limited to being used on a vehicle, and can be used also on other machines and equipment.

The present application claims for priority based on Japanese Patent Application No. 2013-153506 filed with Japan Patent Office on Jul. 24, 2013, and all the contents of this application are incorporated in this description by reference.

The invention claimed is:

1. A shock absorber mounting device that joins a shock absorber, provided between an axle and a vehicle body, to the vehicle body, the shock absorber mounting device comprising:
    a magnetic rubber mount having magnetic particles thereinside and being provided between the shock absorber and the vehicle body;
    an electromagnetic coil configured to apply a magnetic field to the magnetic particles; and
    a controller configured to supply an excitation current to the electromagnetic coil to control the magnetic field applied by the electromagnetic coil;
    a vehicle body side joining member that joins the magnetic rubber mount to the vehicle body;
    a shock absorber side joining member that joins the magnetic rubber mount to the shock absorber; and
    a yoke member that directs the magnetic field applied by the electromagnetic coil between the vehicle body side joining member and the shock absorber side joining member,
    wherein the magnetic rubber mount is arranged on an inner side of the electromagnetic coil, and the vehicle body side joining member, the shock absorber side joining member, and the yoke member cover the electromagnetic coil.

2. The shock absorber mounting device according to claim 1, wherein the shock absorber is an extendable and retractable cylindrical shock absorber, and the magnetic field produced by the electromagnetic coil acts on the magnetic rubber mount along a direction of extension and retraction of the shock absorber.

3. The shock absorber mounting device according to claim 1, wherein
    the controller performs control to reduce the excitation current supplied to the electromagnetic coil as an up-down acceleration of the shock absorber increases.

4. The shock absorber mounting device according to claim 1, wherein
    the controller performs control to increase the excitation current supplied to the electromagnetic coil as a running speed of the vehicle body increases.

* * * * *